Jan. 23, 1968 S. J. CIRCLE ETAL 3,365,440
PROCESS OF NON-EVAPORATIVE COUNTER-CURRENT CONCENTRATION
OF SOLIDS IN THE PROCESSING OF PROTEIN AND
CARBOHYDRATE-CONTAINING
Filed April 21, 1965 MATERIALS FROM SOYBEANS 2 Sheets-Sheet 1

INVENTORS:
Sidney J. Circle
and Robert W. Whitney,
BY Dawson, Tilton, Fallon + Lungmus,
ATTORNEYS.

United States Patent Office 3,365,440
Patented Jan. 23, 1968

3,365,440
PROCESS OF NON-EVAPORATIVE COUNTER-CURRENT CONCENTRATION OF SOLIDS IN THE PROCESSING OF PROTEIN AND CARBOHYDRATE - CONTAINING MATERIALS FROM SOYBEANS
Sidney J. Circle, Chicago, and Robert W. Whitney, Mundelein, Ill., assignors to Central Soya Company, Chicago, Ill., a corporation of Illinois
Continuation-in-part of application Ser. No. 837,893, Sept. 3, 1959. This application Apr. 21, 1965, Ser. No. 452,465
5 Claims. (Cl. 260—123.5)

This application is a continuation-in-part of Serial No. 837,893, filed Sept. 3, 1959, now abandoned.

This invention relates to the recovery of solids and, more particularly, to a process involving non-evaporative, countercurrent concentration of solids in the processing of protein and carbohydrate-containing materials from soybeans, and their fractionation.

Illustrative of the utility of this invention is the separation of the water-soluble solids from soybeans. These water-soluble solids contain commercially valuable protein, specifically alkali-soluble, acid-precipitable protein sometimes termed "glycinin" or "globulin," or "glutenin," or "glutelin." They also contain other valuable soluble matter including water-soluble or acid-soluble protein (also termed "albumin"), sugars, vitamins, enzymes, minerals, phosphatides, pigments, gums, saponins, isoflavones, etc. and "beany" or bitter principles. Some confusion has occurred in the literature on soybean protein concerning the meaning of the term "glycinin." Originally this referred to the protein fraction soluble in sodium chloride solution, precipitable by ammonium sulfate, redissolved in water and reprecipitated by dialysis in water, and this fraction was classified as a "globulin." Later workers have applied the term "glycinin" to the alkali-soluble, acid-precipitable protein fraction, which is the main storage protein of the soybean cotyledons. However, technically speaking, the properties of the alkali-soluble, acid-precipitable protein fraction are more nearly in accord with the classification "glutelin" or "glutenin." Thus, it is seen that to a great extent these terms have been used interchangeably.

We use the term "alkali-soluble, acid-precipitable protein" in a broad sense as a convenient designation for the major protein fraction of the soybean. However, it is to be understood that this protein fraction may or may not be completely alkali extractable from commercial soybean source material, depending upon the prior history of the latter's processing and the conditions of extraction.

In addition, there exists a smaller protein fraction in the soybean (approximately 5% of the total nitrogen), soluble in water or alkaline solution, which is not acid-precipitable, but is heat-coagulable, thus conforming to the classification "albumin."

However, neither the "glycinin" nor the "albumin" fractions are homogeneous, the alkali-soluble, acid-precipitable protein containing at least three components differing in electrophoretic properties, and the "albumin" containing at least twelve separate components.

Thus, it is evident that in the process of fractionating soybean material, the composition with regard to protein of the fractions obtained may vary to a greater or less extent depending on the conditions of fractionating used. The same conclusion applies to the non-protein components.

Heretofore, the prime object has been to achieve the separation of the alkali-soluble, acid-precipitable protein in a purified form, relatively free of these other soluble materials. In the procedure for purifying the alkali-soluble, acid-precipitable protein, large quantities of water are used for washing these other soluble materials out of the vegetable protein, thus leaving these soluble constituents in such dilute form that it is uneconomical to recover them in concentrated dry form. No procedure has been advanced for providing the alkali-soluble, acid-precipitable protein in the purified form necessary without employing these large quantities of washing liquid—thus the art has been faced with the problem of disposing of these dilute solutions of the carbohydrates, etc.

According to Smith et al. (Journal of Agricultural and Food Chemistry, vol. 10, p. 302, col. 1, 1962):

"The B.O.D. (biological oxygen demand) of soybean whey from a plant with a 5-ton daily capacity of isolated protein is estimated to be equivalent to that needed by a city of 25,000 to 30,000 population using 80 to 100 grams of oxygen requirement per day per capita. As an economical recovery method has not yet been developed, whey represents a serious waste disposal problem"; also "soybean whey . . . represents about one-third of the meal."

The magnitude of the problem is indicated by the production figure of 27 million pounds of isolated soy protein for the year 1951, as reported by Smith in chapter 10, page 261 of "Processed Plant Protein Foodstuffs," A. Altschul, editor, Academic Press, New York, 1958. On page 259, he states, "a yield of 30% would be considered good" of isolated protein from soybean meal commercially. Thus, the production of each pound of isolated protein generated at least a pound of soybean whey, total production of which in 1951 would have involved a sewage disposal problem with a population equivalent of 180,000 to 220,000. Since the trend of isolated soy protein production and utilization has been reported as increasing (Smith, page 261), the whey disposal problem is growing in seriousness.

The problem of disposing of the large quantities of whey and of washing liquids has been aggravated by the increasing concern about water pollution when these materials are sewered. The increasing rigidity of governmental restrictions on sewage can be seen in the Federal Water Pollution Control Acts of 1948 (Public Law No. 845), of 1956 (Public Law No. 660), and of 1961 (Public Law No. 660 as amended 1961, PL 87–88), as well as the water pollution control legislation of various state and other governmental bodies.

More specifically, in one approach to the processing of soybean seeds to obtain commercially useful protein, it has been the practice to use large amounts of acidic aqueous solutions in leaching the seed material to remove the water-soluble fraction therefrom. This usually precedes further processing to isolate the protein from the seed material. In this procedure, it has been customary to extract the other water-soluble constituents of the soybean by leaching the soybean material in an acid medium (pH 4–5) in which the alkali-soluble, acid-precipitable protein remains insoluble. After removal of the other soluble materials, the protein is solubilized in an alkaline aqueous solution, separated from the insoluble source material, and thereafter is precipitated in isolated form with acid.

In this procedure, there is a loss of about one-third of the source material, i.e., the water-soluble solids. This loss has been tolerated because the recovery of the water-soluble fraction from dilute solution involved an expenditure of more money than it was worth. One proposed method for disposing of the large volumes of very dilute solutions of sugars, etc. was the use of the activated sludge process. To permit sewering the water-soluble fraction through this manner has proven very expensive. Another proposed method through fermentation has also proven expensive.

An important reason for the practice of using large quantities of washing liquid for separating the water-soluble portion other than the alkali-soluble, acid-precipitable protein, is to leach out the colored, gummy, bitter-tasting and mucilaginous constituents present in the seeds which would downgrade the quality of the protein and limit the maximum yield thereof. To make sure that these undesirable contaminants of the protein were thoroughly removed, it was found necessary to use large quantities of washing liquid at some stage prior to drying of the protein. Typical of the maximum concentration of the water-soluble solids in the leaching solution, i.e., of water-soluble solids except alkali-soluble, acid-precipitable protein, reached in practice, is that of about 1 to 2 percent.

In the process of isolating soybean protein from soybean source material, the present commercial practice is to extract the proteinaceous material in the pH range 6-11, using alkaline agents, alone or in combination, such as caustic alkali, lime, ammonia, or alkaline salts. Although it is known that yields of protein up to 30% higher can be obtained from commercial soybean source material by extracting with alkali in the pH range 11-13, nevertheless the accompanying extraction of significantly more malodorous or bitter flavoring matter, pigmentary matter, mucilaginous or gummy material and phytates in addition to the sugars will also take place unless these contaminants have been removed from the soybean source material beforehand, and these will tend to co-precipitate with the protein, from which they are difficult to remove without using inordinate amounts of washing liquid. Also the presence of sugars in these highly alkaline protein solutions (pH 11-13) tends to lead to their caramelization and to browning reactions (interaction of protein and other nitrogenous matter with sugar, so-called "Maillard reaction"), which formed pigments also co-precipitate with the protein, thus downgrading its quality. By employing our invention, these undesirable water-soluble non-protein constituents are substantially completely removed from the soybean source material before the highly alkaline protein extraction step, hence are absent in the protein solutions at pH 11-13, and hence do not contaminate the protein when it is precipitated, thus permitting the desired yields of alkali-soluble, acid-precipitable protein up to 30% higher than in the alternate procedure, and, significantly, of an equal or better quality.

A general object of this invention is to provide a novel procedure for the economical non-evaporative recovery of a water-soluble portion from a soybean source thereof, wherein the non-evaporative recovery occurs in such concentration as to make practical further evaporative concentration thereof either to a syrup (i.e., above about 8% solids) or dry form. Those skilled in this art have not been able to solve the problem of economically concentrating the water soluble portion. [Smith, Economic Botany 8, p. 300 (1954); Smith, Nash, Eldridge and Wolf, J. Agr. Food Chem. 10, p. 302 (1962).] This material has been found suitable for food, feed and fermentation purposes. Another object is to provide a novel process for the handling of waste liquor obtained from the treatment of proteinaceous substances to minimize pollution problems. Still another object is to provide a procedure for the treatment of vegetable protein materials such as soybeans in which a pre-leaching step is employed to bring about increased yield and quality of alkali-soluble, acid-precipitable protein while providing the water-soluble solids other than the above-mentioned protein in concentrated form. Yet another object is to provide a novel composition of matter which includes the water-soluble solids portion of soybeans in concentrated form. Other objects and advantages of this invention can be seen as this specification proceeds.

In one embodiment of the invention, a stream of soybean material containing as part of its ingredients a water-soluble portion, is passed in countercurrent relation with a stream of solvent for the portion. The ratio of the streams is adjusted to provide a concentration of the water-soluble fraction in the solvent effluent stream of at least 2 percent. In a specific application of this invention, the source of material of the part to be dissolved may be soybean flakes. Illustrative of other particle forms, the soybeans may be cracked, granulated, etc. However, flakes have usually been employed in industry and this form provides very satisfactory results in the operation of the invention. The term "soybean flakes" as used above, includes the flake which results from solvent extraction of flaked, full-fat soybeans. The term "flake(s)," as used herein, represents a product from the passage of the whole or cracked seed through smoothing rolls to produce flakes. When these flakes are treated with a solvent to extract the oil and the solvent remaining in the flakes is removed, there results flakes containing less than 2 percent oil, and such flakes are suitable for the invention. However, as will be brought out hereinafter, the soybean flakes still containing the oil may also be advantageously used in the invention.

When soybean protein sources are used in the practice of the invention, the water-soluble portion ordinarily contains an amount of carbohydrate. In soybeans, the water-soluble fraction, exclusive of the alkali-soluble, acid-precipitable protein, constitutes about 25-35% if the bean has been previously subjected to an oil separation step, or somewhat less if a full-fat bean is employed. Usually, however, the flake or granulated bean is first treated with a lipophilic solvent to remove valuable oil, a conventional solvent for this being hexane.

The solvent for the water-soluble portion may take a variety of forms, including a variety of aqueous solutions which are effective to immobilize the alkali-soluble, acid-precipitable protein in some manner while performing the operation of separating out all of the other hydrophilic constituents. Among the protein-immobilizing solvents available are various aqueous acidic media, preferably those having a pH in the isoelectric range of the alkali-soluble, acid-precipitable protein, that is, a pH in the range 4 to 5. The acids selected for this may include sulfurous, sulfuric, hydrochloric, lactic, acetic, carbonic, and phosphoric, although other acids may be conveniently employed depending upon the ultimate usage of the protein product. Another protein-immobilizing solvent is chilled water, with or without the presence of alkaline earth cations such as calcium and magnesium ions. Still another group of protein-immobilizing solvents includes water-miscible organic solvents such as acetone, the lower alkanols, dioxane, dimethyl sulfoxide, and the like. Relative to the use of these organic solvents, we find most effective the range of about 20-80% of the solvent mixed with water, with maximum effectiveness being reached at about 60%. Organic solvent concentrations less than 20% result in too much undesirable swelling of the soybean source material due to water imbibition. The swelling interferes with subsequent pressing necessary for solvent recovery and drying of the leached flakes. Organic solvent concentrations in excess of 80% do not remove as high an amount of the water-soluble solids, in particular the bitter components.

The aqueous organic solvents have been found advantageous in that they reduce swelling of the flakes, achieve more efficient removal of the bitter constituents and other solubles, and provide a bacteriostatic action. In this latter aspect, the aqueous organic solvents protect both the protein and the solubles against degradation. Further, we have found that the aqueous organic solvents operate to remove the least amount of alkali-soluble, acid-precipitable protein and albuminous protein when employed for leaching out the aqueous organic solvent-soluble portion. Only about 2% to 4% of the total soybean nitrogen is taken up into the solubles, this low quantity being achieved since most of the nitrogenous components are generally insoluble in the organic aqueous solvents.

We have also found that after thorough extraction with 60% organic solvent in water, a subsequent extraction with 90–100% organic solvent accomplishes two significant purposes: (1) further removal of certain bitter components and color matter not previously completely removed by the 60% solvent; and (2) removal of water from the solvent-saturated leached flakes, thus expediting later solvent recovery from, and drying of, the leached flakes.

Further, we have found that the addition of alkalis such as NaOH, KOH, $NH_3$, and the like, in the final solvent extraction, leads to a more water-soluble protein in the dried leached flakes, without loss of protein during the solvent extraction.

The ratio of the solvent stream to the stream of source material may also be varied. Ordinarily, the weight ratio of the solvent stream in contact with the source stream should be kept below about 15, based on the source stream being defatted flakes, in order to achieve a substantial non-evaporative concentration of the solubles portion in the solvent effluent stream so as to make further evaporative concentrating of this stream practicable. With 15 parts of aqueous solvent to one part of defatted soybean flakes, for example, the effluent stream will contain at least about 2.2% concentration of the water-soluble portion. Decreasing this ratio, i.e., decreasing the parts of solvent contacted with each part of the source material, results in increasing the concentration of the solubles in the solvent effluent stream. As a practical matter, we have found that ratios below about 5 to 1 for aqueous acid leaching and 2 to 1 for aqueous organic solvent leaching result in problems of mechanical handling of the soybean flakes, since the solvent effluent stream becomes highly viscous. Also, longer treating zones are required. Those solvent-flake ratios which provide effluent stream concentrations of the solubles portion other than the alkali-soluble, acid-precipitable protein, of from about 5% to about 15%, have been found most effective. these ratios being in the range of 2:1 to 10:1.

In general, the variation of solids concentration in the clarified supernatant liquor with different solvent-flake ratios would be represented approximately by the data in Table I. The concentrations of solubles achieved in the clarified supernatant liquor as shown below represent those theoretically obtainable in a single stage batch extraction. Ordinarily, in a single stage batch aqueous acid-leach extraction the dry soybean source material takes up at least about four times its own weight of water in a non-fluid or non-mobile form, similar to water of hydration. If the extraction is made in a countercurrent manner, the concentration of solubles in the clarified supernatant liquor is essentially doubled for the same solvent-flake ratio.

Table I

| Ratio, solvent flakes: | Percent solids in clarified supernatant leach liquor |
|---|---|
| 27 | 1.2 |
| 15 | 2.2 |
| 10 | 3.2 |
| 5 | 6.7 |
| 4 | 8.3 |
| 3 | 11.1 |
| 2 | 16.7 |

The passing of the two streams in countercurrent relation may be achieved through the use of a wide variety of treating equipment (mass transfer contactors). This includes vertical towers, basket extractors of various types, batch vessels interconnected for countercurrent operations, and the like. The invention also may be practiced using either continuous or discontinuous flow apparatus.

A specific column of the type which has been satisfactorily employed in the practice of the invention is illustrated in U.S. Patent No. 2,074,988. Soybean flakes are introduced at the top of the column and flow downwardly by gravity and countercurrent to the incoming and rising solvent which is introduced at the column bottom. The leach liquor or "whey" is withdrawn continuously at the top of the column while the leached flakes are withdrawn from the bottom of the column, through a suitable unloading device.

The invention will be described in conjunction with the accompanying drawings, in which—

Figures 1, 2:
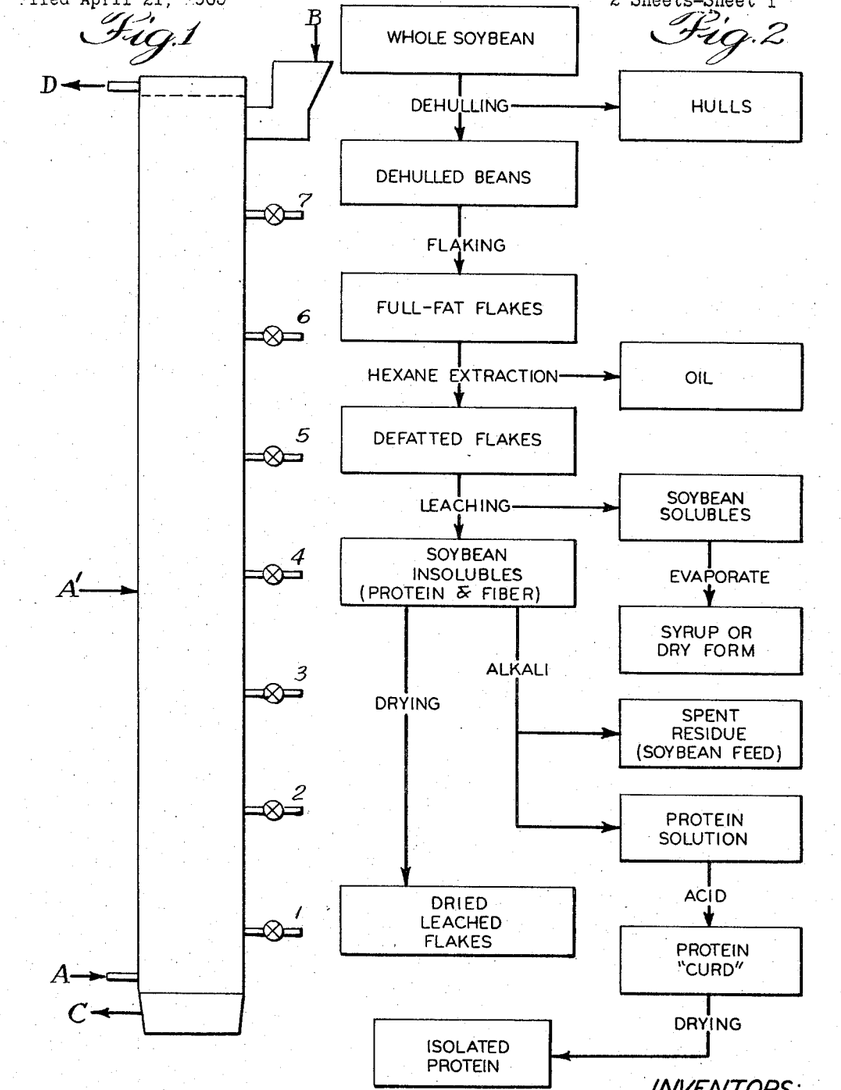
FIG. 1 is a diagrammatic view of one type of an extracting or leaching column which may be employed in the practice of the invention and which is referred to in connection with the examples following.
FIG. 2 is a flow diagram of a process of separating and fractionating soybean constituents as can be practiced according to a combination of aspects of the invention.

Referring now to FIG. 2, there is seen a diagram which ilustrates one series of the steps that may be performed in the practice of the invention in separating the various fractions of whole soybeans. The first step shown is a dehulling operation in which the soybean hulls are removed. Ordinarily, this accounts for about 8% of the weight of the whole soybean. The dehulled bean includes about 10% water, 40% protein, 20% fat, with the remainder including mainly soluble carbohydrates and other soluble organic matter, insoluble fibrous materials, and minerals.

The dehulled beans are subjected to a flaking operation. The resultant flakes may be subjected to defatting by means of contact with hexane to remove the oil. The flakes before entering the extraction step usually contain from about 15% to 20% oil. The oil is commercially valuable in that it can be used in margarine, shortening, and other food and industrial products, and also it provides a source of lecithin, useful in food and industrial applications.

Still referring to FIG. 2, the defatted flakes are subjected to a leaching operation which separates the solubles from the solvent-insoluble solids, including the protein. Such an operation can be performed, for example, with the apparatus shown schematically in FIG. 1 and which will be described hereinafter. The solubles, i.e., the leach liquor solids, as explained above, include all those soluble materials with the exception of the alkali-soluble, acid-precipitable protein. However, the solubles, even though so defined, still may include some solvent-soluble protein. Historically, some leaching operations have had the flakes leached with neutral or alkaline aqueous solutions to provide a curd and whey mixture, after acidification. The soybean solubles may thereafter be evaporatively concentrated to provide syrup or dry form material.

Typical of the composition of the soluble solids in the solvent effluent from the leaching step is a carbohydrate (i.e., sugars, etc.) concentration of about 40% to 50% on the dry basis. The solvent-soluble nitrogenous matter constitutes up to 20% (percent $N \times 6.25$) of the dry form of these water-soluble solids. The 20% is obtained in the acid or chilled water leaching, while the aqueous organic solvent leaching provides solids with about 7% nitrogenous matter (percent $N \times 6.25$), the difference being the albuminous nitrogen. Prior to leaching, the defatted flakes contain up to 13% or so of the soluble carbohydrates (i.e., sugars, etc), so the countercurrent leaching step itself provides a means of separating and concentrating these solvent soluble solids.

Remaining in solid form during the leaching step are the solvent-insoluble solids (i.e., the cellulosic or fibrous materials), and the alkali-soluble, acid-precipitable protein. Upon subjecting these leached solids to an alkaline solvent, the protein is extracted, leaving the spent residue and forming a protein solution which thereafter may be acidified to protein "curd" and dried as isolated protein. Alternatively, as pointed out above, these combined materials may be dried directly to provide a useful industrial or edible product, dried leached flakes which can be comminuted, if desired.

For the leaching step described above, the apparatus seen in FIG. 1 can be conveniently employed. The schematic illustration there represents a vertical continuous counter-current gravity type of extracting or contacting tower. The leaching liquid is introduced adjacent to the bottom, as at A, while the soybean flakes, either full-fat or defatted, are introduced adjacent the upper end, as at B. The spent or extracted flakes are removed from the bottom as at C, while the leaching liquor is removed at the top as at D. The leaching liquor includes the liquid introduced as at A less that amount needed to saturate the flakes and permit them to be removed from the bottom by suitable mechanical means. This liquor is fortified by the water-soluble solids other than alkali-soluble, acid-precipitable protein which have been leached from the flakes traveling vertically downward in the tower. In the following examples, reference will be made to the composition of the leaching liquor at various zones within the tower, and these zones are identified by valve taps seen in FIG. 1 and designated by the numerals 1 through 7. Where fewer taps are indicated in the examples, a corresponding tap spacing is employed.

As pointed out above, additionally advantageous operation occurs when the flakes are finally leached with a more concentrated organic solvent so that the exiting flakes are proportionately lower in water content. In the apparatus seen in FIG. 1, this is achieved by introducing the usual leach liquor (i.e., about 60% organic solvent and 40% water) at A', and introducing 90–100% organic solvent at A.

Illustrative of the practice of the invention are the following examples:

EXAMPLE 1

This example demonstrates the operation of a continuous countercurrent extraction system employing a small-scale plateless column (see FIG. 1) with an input rate of 22 lbs. per hour of dry soybean flakes at the top. A constant flake-bed height of about 4 feet from the bottom was maintained. A few hours were required to obtain stratification of solvent-soluble solids and steady state operation. Sampling ports, placed at various distances from the bottom of the column, were used to obtain the stratification of solids data.

The flakes at a pH of 6.8 (reaction in water) were introduced at the top of the column, along with hydrochloric acid, and acidified water was introduced at the bottom at a rate of 320 lbs. of water per hour. Under these conditions, an overflow of liquid of about 80–90 lbs. per hour and an underflow of about 230 lbs. per hour were obtained. The residence time of the flakes in the column was about 1 hour. Table II below shows the data obtained.

Table II

| Sample location | Number of feet from bottom | Temperature °F. (aqueous solvent) | pH | Percent solids in clarified supernatant leach liquor | (Percent N×6.25) clarified supernatant leach liquor |
|---|---|---|---|---|---|
| Top | 6.7 | 100 | 4.4 | 9.09 | [1] 1.79 |
| 6 | 5.8 | | 4.4 | 9.07 | 1.79 |
| 5 | 4.8 | | 4.3 | 9.09 | 1.80 |
| 4 | 4.1 | | 4.8 | 8.14 | 1.59 |
| 3 | 3.3 | | 5.0 | 2.74 | 0.54 |
| 2 | 2.4 | | 5.2 | 0.55 | 0.18 |
| 1 | 1.4 | | 5.2 | 0.05 | 0.04 |
| 0 | 0.75 | | 4.9 | 0.05 | 0.02 |
| Bottom | 0 | 110 | 4.9 | 0.05 | 0.02 |

[1] Overflow.

In the operation of the column, the residence time of the flakes within the column can be varied within wide limits, but it is understood that an increase in residence time will decrease the throughput rate. Accordingly, in practice, it is desirable to run a column with minimum residence time of the flakes in the column needed to achieve thorough leaching. Such residence time is dependent to a degree on temperature, which affects the diffusion rates of the water-soluble constituents in the flake. Thus, we find that a residence time of about one hour is suitable when employing solvent temperatures in the range of 50 to 160° F. Although higher temperatures can be used, these are not preferred, since some protein denaturing may occur.

In the aspect of the invention just described, we have found that we can treat soybean flakes with an acidulated aqueous solution in a countercurrent system to obtain from one end of the system a leach liquor comprising water-soluble solids, the concentration of the solids being above about 2% by weight (if desired, up to 30% or more), and from the other end, leached flakes substantially free from water-soluble solids and specifically adapted for either drying or for further protein recovery treatment. The upper level of about 30% concentration in the exiting leach liquor of recoverable solids represents the value which permits thorough leaching of the flakes while keeping the residence time of the flakes in the system low enough to permit economical operation and without substantial detriment to the protein contained in the flakes.

Commercial soybean flakes usually have a pH reaction when immersed in water in the range of 6.5 to 7.0. Thus, to immobilize the acid-precipitable protein, we contact the flakes with an aqueous acid in the proper proportions to bring the pH reaction to the range 4.0–5.0. Where a column is used in the continuous countercurrent extraction system, acid may be introduced at both ends of the column. At the top and where the flakes (usually dry) are introduced, we prefer to add a small volume of highly concentrated acid, which is readily diluted by the large volume of exiting leach liquor prior to its withdrawal from the column, whereas at the other end, we prefer to introduce a large volume of very dilute acid to contact the exiting spent flakes at a point prior to their withdrawal from the column. In this manner, we succeed in maintaining the optimum pH condition for immobilizing the protein throughout the column while at the same time achieving an optimum gradient of concentration of solvent-soluble solids. There is a high concentration of solubles in the leach liquor supernatant, at the point where the flakes are added to the system and leach liquor is withdrawn, and an extremely low concentration of solvent-soluble solids in the leach liquor at the end where the spent flakes are withdrawn and the aqueous leach solvent is introduced. The clarified supernatant leach liquor containing 9.09% solids was thereupon evaporated to a syrup consistency.

EXAMPLE 2

Another acid leaching run similar to that of Example 1 was conducted and the data are shown in Table III below.

In this instance, however, only the concentration of solvent-soluble solids is shown at the sample ports indicated. Here, the flake input rate was lowered to about 18–19 lbs. per hour, with the leach liquor overflow rate being reduced to about 45 lbs. per hour. This example shows the efficiency of the operation of the continuous countercurrent system described herein in obtaining high solids concentration in leach liquor issuing from the top of the column. This leach liquor (at 13.23% solids) was directly spray-dried to a dry powder.

*Table III*

| Sampling location: | Percent solids in clarified supernatant leach liquor |
|---|---|
| Top | 13.23 |
| 6 | 12.91 |
| 5 | 12.67 |
| 4 | 12.17 |
| 3 | 10.62 |
| 2 | 7.73 |
| 1 | 1.87 |
| 0 | 1.03 |
| Bottom | 1.20 |

EXAMPLE 3

This example demonstrates a further run using acid leaching in the continuous countercurrent system described above, except that a flake feed rate of 30 lbs. per hour was employed, in combination with a solvent overflow rate of 100 lbs. per hour. The results are seen in Table IV below:

*Table IV*

| Sampling location: | Percent solids in clarified supernatant leach liquor |
|---|---|
| Top | 9.92 |
| 6 | 9.63 |
| 5 | 9.30 |
| 4 | 6.15 |
| 3 | 0.81 |
| 2 | 0.39 |
| 1 | 0.06 |
| Bottom | 1.04 |

The leach liquor from the top was evaporated to a syrup consistency.

EXAMPLE 4

In a discontinuous multiple batch type of countercurrent extractor (contrasted to the continuous flow-type extractor employed in conjunction with the runs reported in Examples 1–3) and using acid leaching, the following results were achieved:

*Table V*

| Sample position | pH | Clarified supernatant leach liquor | |
|---|---|---|---|
| | | Percent total solids | (Percent N×6.25) percent of acid-soluble protein |
| Exiting flake | 4.2 | 0.10 | 0.02 |
| 2 | 4.1 | 0.26 | 0.08 |
| 3 | 4.1 | 0.57 | 0.13 |
| 4 | 4.0 | 1.12 | 0.23 |
| 5 | 4.1 | 4.43 | 0.45 |
| Exiting leach liquor | 4.0 | 4.49 | 0.72 |

The percent protein figure referred to above refers to total nitrogen times the factor 6.25 as determined by the Kjeldahl method. A typical sample of the "acid-leached" solubles in the recovered dry state as obtained by either discontinuous multiple batch countercurrent or continuous countercurrent extraction as described above has the following analysis.

*Table VI*

| Constituent: | Percent |
|---|---|
| Moisture | 10 |
| "Protein" (percent N×6.25) | 20 |
| Ash | 16 |
| Non-reducing sugars (mainly sucrose) | 30 |
| Reducing sugars | 10 |
| Other misc. components | 14 |

The solvent-soluble nitrogenous matter includes about 50% albuminous type protein and the remainder diverse nitrogenous compounds of non-protein nature, and is quite different from the acid-precipitable protein left in the leached flakes. In general, these "whey" solids are a complex mixture comparable to a milk whey. Thus, uses for the recovered "whey" solids or the leach liquor containing such can include food products, animal feed, and fermentation products, as well as non-edible end uses.

The leached flakes obtained by the process described above can be further processed for extraction of alkali-soluble, acid-precipitable protein in accordance with conventional methods. A typical analysis of these flakes before and after treatment to recover water-soluble solids would show the starting flakes to be composed of approximately 50% protein and 20% insoluble carbohydrate and 30% solubles; exiting leached flakes, after drying, approximately 70% protein and 30% insoluble "carbohydrate."

In another aspect of the invention, we use a water-miscible organic solvent such as acetone, dioxan, dimethyl sulfoxide, or various of the lower alcohols in aqueous solution to immobilize the protein by their insolubilizing action, pH being relatively immaterial, and, in fact, rather without meaning in the organic solvent concentrations used, thus not requiring addition of acids or alkalis. Thus the pH need not be in the isoelectric range of the alkali-soluble, acid-precipitable protein (pH 4 to 5) when using these solvents, but can be as high as the natural or normal pH range of the flakes, 6.6–7.0. Further, we find pH values in the range 5–8 suitable.

In this aspect of the invention, we treat soybean flakes with aqueous solutions of an organic solvent such as alcohol in a countercurrent system to obtain (1) from one end of the system an aqueous leach liquor comprising solvent-soluble solids, the concentration of said solids being at least above 2% by weight, and, if desired, up to 30% and above; and (2) leached flakes from the other end of the system, the leached flakes being substantially free of solvent-soluble solids other than alkali-soluble, acid-precipitable protein, and adaptable for drying or for recovery of this protein.

The protein is immobilized by the use of an aqueous solution of an organic solvent which may be a lower alcohol such as methyl, ethyl, or isopropyl alcohol in weight concentrations of 20–80% of solvent. Advantages realized by this are: (1) no swelling of the flakes, (2) protection of the leached flakes and solubles against microbial degradation (by yeasts, molds or bacteria) due to the bacteriostatic activity of the organic solvents, (3) a significant improvement in quality of isolated protein from the leached flakes due to the fact that these organic solvents are capable of removing most of the color, bitter-tasting components, and non-nitrogenous constituents from the flakes, and (4) the albuminous protein is recovered in the leached flakes (being insoluble in the organic solvent).

The employment of any specific temperature is not critical, and the general concept is to use temperatures as high as is permissible before appreciable heat denaturation of the protein occurs. Thus, temperatures within the range of 20–120° F. can be employed, although preferred temperatures are in the range of 45–80° F. It is, of course, understood that temperatures higher than 120° F. may be used, if heat denaturation of the flakes is of no consequence.

Especially effective for this purpose are organic solvents which are miscible in all proportions with water. Exemplary are those alkanols selected from the class of methanol, ethanol and isopropanol. These solvents also possess the desirable characteristic of not swelling the soybean flake. Where the soy fractions are to be employed in foods, ethanol is preferred, but if uses of the soy fractions other than as food ingredients are contemplated, less expensive water-miscible organic solvents may be employed.

In the operation of the column, the flakes, as defined above, are fed at one end such as at the top of a vertical column, through a suitable feeding device, for example, a screw or a vibratory system, the column being full of leach liquor as well as containing a bed of flakes. The leach solvent is introduced at the bottom of the column and is required to traverse the downwardly-moving bed of flakes before it can overflow at the top. Stratification of the rising solvent-soluble solids is maintained throughout this operation. The spent flakes are removed from the bottom by a suitable device, for example, a screw or a drag link conveyor. Suitable controls and mechanical devices as will be understood by those skilled in the art are provided to permit control of all input and output rates for both liquids and solids and to permit maintenance of steady state operation and of material balances as noted heretofore.

Although the above description of a column extractor relates to the use of a vertical gravity-type extractor column, our invention both in this aspect and the other aspects reported herein contemplates the use of other contacting devices known to the art, whether batch or continuous.

In the extraction of flakes in the column as described above, the operation is carried out so that intimate contact of downwardly-moving flakes with rising leach liquor is maintained at every point, permitting ready diffusion of all water-soluble or solvent-soluble matter. As before, we maintain a moving bed of flakes providing only sufficient gentle agitation to prevent "hang up," "bridging" or "channeling" of the bed of flakes and yet retaining stratification of rising solvent-soluble solids (solubles). By "stratification of solvent-soluble solids," we mean that a gradient is maintained, from essentially nearly zero concentration of water-soluble solids in the supernatant liquid at the bottom and increasing up to 15% or higher in the leach liquor at the top or overflow section. Again, the specific examples of our invention will demonstrate the stratification of solvent-soluble solids at different levels or heights in a small-scale column and in a multiple batch or discontinuous system.

Our invention provides a unique system for immobilizing the protein in soybean flakes to permit non-evaporative concentration of solubles, to our knowledge not heretofore described anywhere, and which we can extend to treat other like vegetable protein source materials.

We have found, for example, that when we employ this method of operation with a column, an economical concentration of solubles is obtained. Further, the quality of the protein which is later isolated is improved with regard to flavor and color in comparison to protein prepared without this pre-leaching step, and the quantity yield of isolated protein is enabled to be increased substantially.

In investigating the range of solvent concentrations for various organic solvents, each of them being completely water-miscible, we have arrived at the results tabulated below in Table VII, using the following procedure: To 7.1 grams of soybean flakes contained in a 250 ml. bottle, add 100 ml. of aqueous solvent of the concentration shown, stopper and shake for one hour, then filter through filter paper and determine the content of total solids and protein (percent N×6.25).

Table VII

| Solvent | Total solids or protein (percent) | Concentration of solvent in aqueous solution (percent) | | | | | |
|---|---|---|---|---|---|---|---|
| | | 0 | 20 | 40 | 60 | 80 | 100 |
| Ethanol [1] | Total solids | 2.65 | 2.13 | 1.91 | 1.70 | 1.12 | 0.15 |
| | Protein | 0.97 | 0.44 | 0.18 | 0.10 | 0.13 | 0.02 |
| Acetone | Total solids | 2.82 | 2.18 | 1.85 | 1.52 | 0.79 | 0.09 |
| | Protein | 1.31 | 0.62 | 0.26 | 0.13 | 0.02 | 0.03 |
| Isopropanol (98%) | Total solids | 2.68 | 2.06 | 2.02 | 1.75 | 0.84 | 0.04 |
| | Protein | 1.08 | 0.39 | 0.18 | 0.07 | 0.00 | 0.00 |
| Methanol | Total solids | 2.79 | 2.08 | 1.81 | 1.69 | 1.38 | 0.54 |
| | Protein | 1.15 | 0.50 | 0.24 | 0.10 | 0.06 | 0.02 |
| Ethanol [2] | Total solids | 2.78 | 2.05 | 1.75 | 1.64 | 1.24 | 0.25 |
| | Protein | 1.18 | 0.50 | 0.16 | 0.03 | 0.04 | 0.01 |
| Dioxan | Total solids | 2.30 | 1.88 | 1.66 | 1.37 | 0.86 | 0.04 |
| | Protein | 0.84 | 0.40 | 0.13 | 0.06 | 0.03 | 0.01 |
| Dimethyl Sulfoxide | Total solids | 2.68 | 2.66 | 2.10 | 1.74 | 0.97 | 0.29 |
| | Protein | 0.89 | 0.47 | 0.22 | 0.08 | 0.03 | 0.01 |

[1] The organic solvent prior to dilution with water consisted of 9 parts 95% ethanol and 1 part ethyl acetate.
[2] The organic solvent prior to dilution with water consisted of 95% ethanol (specially denatured formula SD-3A).

The foregoing Table VII illustrates that optimum results are obtained when the concentration of the organic solvent in the aqueous solution is in the range of 20–80%, and preferably around 60%. In this range, the extracted solvent-soluble solids remain high, while the extracted protein remains low. Ideally, the non-protein soluble solids extracted should be a maximum while, on the other hand, the protein extracted should be a minimum. The closest approximation to these conditions occurs in the range 20–80%, with 40% to 70% being the optimum range, and 60% being the best in this range.

EXAMPLE 5

This example demonstrates the process of our invention employing a countercurrent multiple batch discontinuous extraction. In Table VIII below, the results of employing the apparatus of Example 4 are reported. In this operation, a 5 to 1 liquid-flake ratio was used with an aqueous solution of 60% acetone as the liquid solvent. This low ratio is effective in view of the fact that flakes do not swell perceptibly on treatment with the solutions described. The operation was conducted with the solution at a temperature of 70° F. The exiting leach liquor at 9.78% solids was further concentrated by evaporation to a syrup consistency.

Table VIII

| Sample Position | pH | Clarified supernatant leach liquor | |
|---|---|---|---|
| | | Percent total solids | (Percent N×6.25) Percent protein |
| Exiting flake | 6.4–6.9 | 0.42 | |
| 1 | 6.4–6.9 | 1.47 | |
| 2 | 6.4–6.9 | 2.79 | |
| 3 | 6.4–6.9 | 4.61 | |
| 4 | 6.4–6.9 | 6.98 | .49 |
| 5 | 6.4–6.9 | 8.40 | .60 |
| Exiting leach liquor | 6.4–6.9 | 9.78 | .67 |

From the above table, it is evident that at 60% acetone concentration, the amount of protein (N×6.25) extracted is less than 10% of the weight of the total solids. Also, based on Table VII, the extra solids extracted by higher concentrations of water are almost entirely protein. Thus, 60% aqueous acetone at pH 6.4–6.9 gives about the same result as an aqueous acid leach at pH 4.6, or aqueous acetone acid leach at pH 4.6, but with a savings in acid, no need to equilibrate to pH 4.6, and without the swelling of flakes encountered in an aqueous acid leach. However, it will be appreciated that, if desired, the aqueous acid leaching can be employed in combination with other methods of protein immobilization.

EXAMPLE 6

The procedure of Example 5 was followed except for a 7:1 solvent-flake ratio and the substitution of 60% aqueous solutions of isopropanol and ethyl alcohol, respectively, for the acetone of Example 5, with the results shown below in Tables IX and X.

TABLE IX

[Solvent: 60% isopropanol in water]

| Sample position | Clarified supernatant leach liquor | |
|---|---|---|
| | Percent total solids | Percent protein |
| Exiting flake | 0.34 | 0.00 |
| 2 | 0.84 | 0.00 |
| 3 | 1.73 | 0.03 |
| 4 | 2.97 | 0.13 |
| 5 | 4.92 | 0.04 |
| Exiting leach liquor | 6.87 | 0.13 |

TABLE X

[Solvent: 60% of (95% ethanol, 9 parts, plus ethyl acetate, 1 part) in water]

| Sample position | Clarified supernatant leach liquor | |
|---|---|---|
| | Percent total solids | Percent protein |
| Exiting flake | 0.28 | 0.03 |
| 2 | 0.24 | 0.02 |
| 3 | 0.56 | 0.04 |
| 4 | 1.17 | 0.08 |
| 5 | 2.14 | 0.17 |
| Exiting leach liquor | 4.97 | 0.31 |

The exiting leach liquors from Tables IX and X were further concentrated to a syrup consistency by evaporation.

In the foregoing examples, the composition of the leach liquor differs dependent upon the type of leach solvent. Where the leach solvent is acidified water (or the chilled water to be described hereinafter), the water-soluble solids in the leach liquor includes "albuminous" protein. This "albuminous" protein has been shown to contain a number of enzymes, trypsin, inhibitors, hemagglutinin and other proteins yet to be identified. On the other hand, the proportion of "albuminous" protein in the leach liquor solids resulting from aqueous organic solvent leaching is relatively lower. In the aqueous organic solvent leaching, the "albuminous" protein constitutes about 2–4% of the total solids recoverable from the leach liquor, while with an aqueous acidic or chilled water leach, the "albuminous" protein constitutes about 8–10% of the total solids recoverable from the leach liquor.

In another aspect of our invention, we are able to immobilize the acid-precipitable protein fraction using chilled water alone. This makes it possible to leach out water-soluble constituents without the necessity of severe pH adjustment, as has been the practice heretofore. As a matter of fact, we prefer to practice our invention with a solution pH of above 5 and up to 8.0. This is not to say, however, that we may not use a small quantity of acid to lower the pH to the desired range. As a matter of interest, such an adjustment of pH can be made to aid in the immobilization of the protein fraction contained in the soybean flake. Chilled water alone, however, is effective in a rapid continuous countercurrent leach, and is also a deterrent to microbial growth, the low temperature being bacteriostatic.

In batch or discontinuous leaching, including a multi-stage batch countercurrent leaching system, we have found it advantageous to add protein-insolubilizing bi-valent alkaline earth cations, such as calcium or magnesium ions, to reinforce the protein immobilization by chilled water. By operating in this manner, we succeed in maintaining the optimum conditions for immobilizing the protein throughout the column or batch vessels, while at the same time achieving an optimum gradient of concentration of water-soluble solids with a high concentration in the leach liquor supernatant (at the point where the flakes are added to the system and leach liquor is withdrawn) and an extremely low concentration of water-soluble solids in the supernatant at the end where the spent flakes are withdrawn and the aqueous leach solvent is introduced.

We also find that a residence time of approximately one hour is suitable when employing water temperatures in the range of 33–50° F., the temperature range we have found particularly effective in practicing this aspect of our invention, with the temperatures in the lower portion of the range, i.e., about 35° F., being most effective.

EXAMPLE 7

This example demonstrates the process of our invention again employing countercurrent multiple batch discontinuous extraction apparatus. The operation was conducted with water at a temperature of 40° F. and a water-flake ratio of 10 to 1. The exiting leach at 6.21% solids was evaporated by spray-drying.

Table XI

| Sample Position | pH | Clarified supernatant leach liquor | |
|---|---|---|---|
| | | Percent total solids | (Percent N×6.25) Percent protein |
| Exiting flake | 7.6 | 0.36 | 0.05 |
| 1 | 7.7 | 0.69 | 0.06 |
| 2 | 7.5 | 1.29 | 0.91 |
| 3 | 7.5 | 1.89 | 1.14 |
| 4 | 7.3 | 2.57 | 1.36 |
| 5 | 7.1 | 3.72 | 1.66 |
| Exiting leach | 7.0 | 6.21 | 2.84 |

The foregoing table shows that a high concentration of solids is obtainable in the leach liquor at a pH well above that ordinarily needed for this operation at higher temperatures.

EXAMPLE 8

Another countercurrent multiple batch discontinuous extraction (as Example 7) was performed, but at a lower pH. The chilled water temperature was 35° F. and contained 2 grams per liter of Epsom salt ($MgSO_4 \cdot 7H_2O$) or 0.2 percent based on the solution weight. Table XII below shows the data for this example wherein about the same water-flake ratio was employed as was in Example 7: The exiting leach was spray-dried to a powder form.

Table XII

| Sample Position | pH | Clarified supernatant leach liquor | |
|---|---|---|---|
| | | Percent total solids | (Percent N×6.25) Percent protein |
| Exiting flake | 6.7 | 0.18 | 0.04 |
| 2 | 6.7 | 0.54 | 0.22 |
| 3 | 6.8 | 1.20 | 0.58 |
| 4 | 6.8 | 2.21 | 1.05 |
| 5 | 6.8 | 4.03 | 1.80 |
| Exiting leach | 6.7 | 6.26 | 2.45 |

EXAMPLE 9

Another run using the apparatus of Examples 7 and 8 was conducted but using 3 grams per liter of calcium chloride in solution and with water-flake ratio of about 14 to 1. The results are shown below:

Table XIII

| Sample Position | pH | Clarified supernatant leach liquor | |
|---|---|---|---|
| | | Percent total solids | (Percent N×6.25) Percent protein |
| Exiting flake | 6.2 | 0.71 | 0.03 |
| 2 | 6.2 | 0.64 | 0.07 |
| 3 | 6.1 | 0.81 | 0.14 |
| 4 | 6.1 | 0.90 | 0.24 |
| 5 | 6.1 | 1.81 | 0.42 |
| Exiting leach | 6.1 | 4.20 | 0.78 |

The exiting leach was spray-dried.

EXAMPLE 10

This example further demonstrates our chilled water process, but when operating in a continuous countercurrent extraction system employing a small-scale vertical gravity-type cylindrical plateless column (see FIGURE 1). The amount of flakes introduced to the column from the top was 10.5 lbs. per hour and water at an input (from the bottom) of 200 lbs. per hour, of which 58 lbs. per hour emerged as overflow. A constant flake-bed height of about 3½ feet from the bottom of the column was maintained. Stratification of solids and attainment of steady state conditions required a few hours before samples were taken. The sampling ports were placed at various distances from the bottom of the column. Table XIV below shows the data obtained. The clarified supernatant at 6.04% solids was spray-dried.

Table XIV

| Sample location | pH | Water temp., °F. | Clarified supernatant leach liquor | |
|---|---|---|---|---|
| | | | Percent total solids | (Percent N×6.25) Percent Protein |
| Top | 7.0 | 45 | 6.04 | 2.39 |
| 5 | 7.0 | | 5.87 | 2.36 |
| 4 | 7.0 | | 5.55 | 2.22 |
| 3 | 7.0 | | 4.92 | 1.91 |
| 2 | 7.0 | | 3.20 | 1.34 |
| 1 | 7.0 | | 0.34 | 0.16 |
| 0 | 6.8 | | 0.28 | 0.10 |
| Bottom | 6.8 | 40 | 0.59 | 0.30 |

EXAMPLE 11

This example is similar to Example 10 except that the flake input was 10 lbs. per hour and the chilled water overflow was 124 lbs. per hour. The column was sampled after 5 hours to determine its steady state operation and stratification of solids:

Table XV

| Sample location | pH | Water temp., °F. | Clarified supernatant leach liquor | |
|---|---|---|---|---|
| | | | Percent total solids | (Percent N×6.25) Percent Protein |
| Top | 7.0 | 40 | 2.69 | 0.95 |
| 5 | 6.9 | | 2.90 | 0.99 |
| 4 | 6.9 | | 3.10 | 1.13 |
| 3 | 6.9 | | 2.22 | 0.84 |
| 2 | 7.0 | | 1.11 | 0.49 |
| 1 | 7.1 | | 0.27 | 0.13 |
| 0 | 7.1 | | 0.16 | 0.07 |
| Bottom | 6.6 | 37 | 0.24 | 0.09 |

The supernatant leach liquor from the top was evaporated to a syrup consistency.

In the foregoing embodiments of the invention, it is to be seen that the countercurrent leaching of soybean solubles resulted in solids concentrations in the solvent effluent of more than 2%, and without evaporation when solvent-flake flow ratios less than 15 were employed. An important feature in this leaching is the immobilization of the alkali-soluble, acid-precipitable protein so that only the soluble solids (sugars, etc.) other than the alkali-soluble, acid-precipitable protein are dissolved by the solvent.

The non-evaporative countercurrent concentration of water-soluble ingredients of protein source materials is effective also when the proteinaceous portion is not immobilized as described hereinbefore. Also, the procedure is effective in multiphase multi-solvent systems, as where the hydrophobic oil from the soybean is extracted by hexane, or the like, and simultaneously the sugars and other hydrophilic components are extracted by organic aqueous solvents. Here, an effluent results that is characterized by two phases, which are readily separable. The lipophilic character of the oil-extracting solvent operates independently of the essentially hydrophilic solvent employed for the water-soluble portion. Thus, by the practice of the invention, the two-phase concentrated solvent effluent can be concentrated not only in respect of solubles, but also in the soybean oil which amounts to some 20% of the whole bean weight.

The advantages of countercurrent leaching can also be achieved in the separation of the alkali-soluble, acid-precipitable protein from the water-insoluble solids. Such a procedure is illustrated in Example 12 below:

EXAMPLE 12

In this run, the material to be extracted had previously been leached of its water-soluble solids, i.e., all those solids which are soluble in water with the exception of the alkali-soluble, acid-precipitable protein. The procedure involved the use of a discontinuous multiple batch countercurrent extraction apparatus with the solvent to flake ratio of 15 to 1. Here, it is to be appreciated that the water-soluble solids previously leached from the flakes constitutes about one-third of the weight of the original flakes. The concentrations of solids at various stages in the apparatus are set forth in Table XVI below:

Table XVI

| Sample Position | pH | Clarified supernatant leach liquor | |
|---|---|---|---|
| | | Percent total solids | (Percent N×6.25) Percent protein |
| Exiting flake | 7.5 | 0.12 | 0.18 |
| 2 | 7.5 | 0.26 | 0.23 |
| 3 | 7.8 | 0.69 | 0.63 |
| 4 | 8.0 | 1.25 | 1.17 |
| 5 | 8.0 | 1.95 | 1.80 |
| Exiting protein extract | 8.0 | 2.25 | 2.31 |

Figure 3:
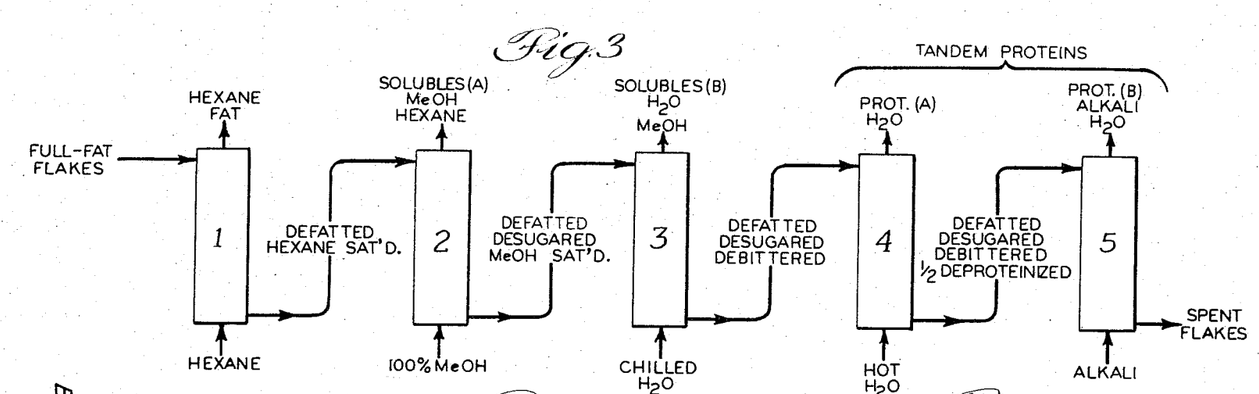
FIG. 3 is a schematic flow diagram of a separation procedure employing various aspects of the invention.

Apparatus for carrying out a compound separation and fractionation of soybeans is illustrated schematically in FIG. 3, and employs various of the procedures heretofore described in conjunction with the examples previously given. In FIG. 3, it is to be seen that at the extreme left, full-fat flakes are provided—these flakes containing the 20% of valuable soybean oil which, as indicated before, is also valuable as a source of lecithin. In extraction tower No. 1, the flakes are seen to flow downwardly and in contact with a hexane solvent which issues from the top containing the fat or oil. The exiting flakes are essentially defatted and are hexane saturated. These defatted flakes are introduced in the top of tower No 2, where they are contacted with 100% methanol, seen being introduced at the bottom of tower No. 2. The issuing solvent effluent contains the remainder of the hexane along with a substantial portion of the methanol introduced and soluble solids designated solubles A. The solids designated solubles A include part of the usual vegetable sugars and other methanol-soluble ingredients. Alternatively, towers Nos. 1 and 2 can be combined in a multi-solvent, multiphase operation, and using methanol in 60% aqueous concentration, as in FIG. 5.

Issuing from tower No. 2 are flakes which have been defatted, partially "desugared," partially debittered, and which are methanol saturated. These are introduced into tower No. 3 wherein they are contacted with chilled water. Issuing as the solvent effluent from tower No. 3 in a water stream which has picked up the methanol from the flakes and carbohydrate and other soluble constituents—these being designated solubles B. Solubles B would include the last traces of the water-soluble solids other than the alkali-soluble, acid-precipitable protein, such as the colored, bitter, gummy, and mucilaginous constituents mentioned hereinbefore. Thus, issuing from the bottom of tower No. 3 are flakes which now have been defatied, further "desugared" and further debittered. In tower No. 4, these flakes are contacted with hot water which when issuing from the top of the tower contains protein designated A and which is essentially an edible grade of protein of unhydrolyzed nature.

Issuing from the bottom of tower No. 4 are the flakes which now have been defatted, "desugared," debittered and about one-half deproteinized. These pass to tower No. 5, in which they are contacted with alkali which strips the remaining protein, i.e., the alkali-soluble, acid-precipitable protein which here would be the industrial grade protein and would include mildly hydrolyzed protein. The flakes issuing from tower No. 5 are designated the spent flakes, which are essentially water-insoluble and are often characterized as including the cellulosic or insoluble carbohydrate portions of the flake. The two types of protein made in this way, we designate as tandem extracted proteins.

In all the foregoing examples, emphasis has been on immobilization of protein, while, at the same time, leaching out the solubles. However, we have discovered that the countercurrent procedures employed above can be adapted to the mobilization or extraction of protein when desired, either simultaneously with solubles leaching or following the solubles leaching.

As mentioned hereinbefore, it is possible to countercurrently extract all of the water-soluble constituents, including the alkali-soluble, acid-precipitable protein, simultaneously with the other solubles. Again, the procedures of the invention all offer operational advantages. Exemplary of the use of the invention in this connection is the teaching set forth below in Example 13.

EXAMPLE 13

Here a run was performed on a continuous countercurrent column utilizing hot water having a pH on the alkaline side of the protein isoelectric range. The water input at the bottom of the tower was 200 lbs. per hour, of which about 70 lbs. per hour was overflow, and the flake input at the top of the tower was 10 lbs. per hour, with a residence time of about 2 hours. About 5 hours were required to achieve proper stratification and steady state operation and the pH values shown in the table below were achieved by fortifying the input water with sodium hydroxide at pH 10.5. The results of this operation can be seen in Table XVII:

*Table XVII*

| Sample position | pH | Temp., °F. | Clarified supernatant extraction liquor | |
|---|---|---|---|---|
| | | | Percent protein | Percent total solids |
| Top | 6.5 | 125 | 5.3 | 10.04 |
| 5 | 6.5 | | 5.65 | 10.50 |
| 4 | 6.5 | | 3.89 | 10.51 |
| 3 | 6.5 | | 3.64 | 10.44 |
| 2 | 6.5 | | 3.14 | 9.22 |
| 1 | 6.9 | | 0.99 | 1.51 |
| 0 | 7.3 | | 1.05 | 1.51 |
| Bottom | 7.5 | | 1.12 | 1.89 |

The pH conditions in the countercurrent extraction may be varied considerably, pH values in the range of 6.0 to 9.0 having been found suitable, with pH ranges of 6.8 to 8.0 being preferred for leaching. When the pH of the extraction is above 9.0, the flakes exhibit a tendency in certain cases to become gelatinous. Also, temperatures may be employed over a wide range of from about 60° up to 180° F. However, below 60° F. the protein exhibits some tendency to be immobilized so that the preferred range is above 100° F. and preferably somewhat lower than 180° F. where there may be some protein denaturation occurring.

Figures 4, 5:
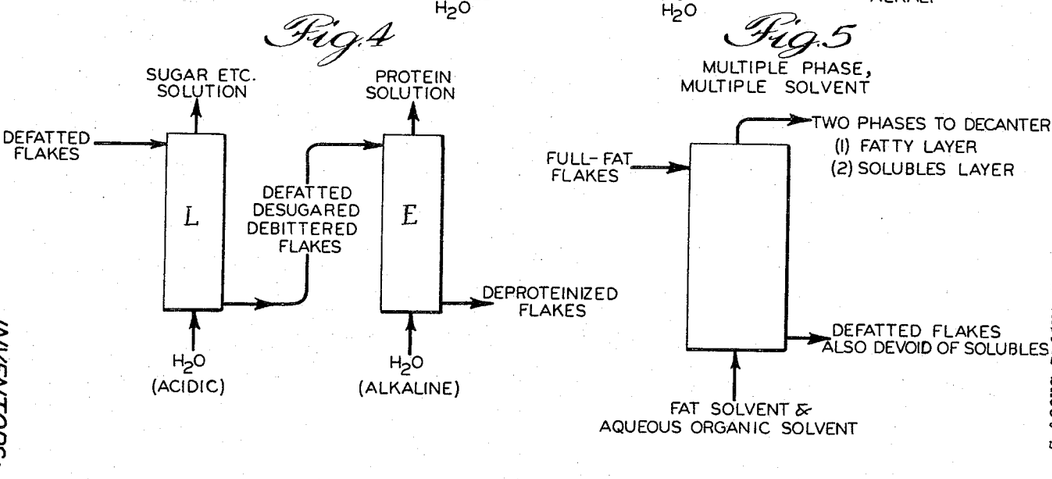
FIG. 4 is another flow diagram illustrating another combination of aspects of the invention.
FIG. 5 is yet another diagram illustrating multiple phase, multiple solvent extraction.

Another modification is seen in FIG. 4, where extraction columns employing continuous countercurrent flow are arranged in tandem. In FIG. 4, column L is seen to perform the leaching operation on defatted flakes, removing therefrom the water-soluble solids other than the alkali-soluble, acid-precipitable protein. The resultant flakes from column L are defatted, desugared and debittered. In column E, these flakes are extracted or deproteinized through the use of an alkaline aqueous solution.

EXAMPLE 14

Illustrative of this operation is one in which chilled water is employed in column L at an entering temperature of about 34° F., the temperature of the solution effluent being 39° F. The ratio of the water to the flake stream in both towers L and E was about 15, with the following results. The extracting solution in column E had a temperature of 160° F. The column not being insulated, the temperature was lower at the top.

*Table XVIII*

COLUMN E

| Sample position | pH | Temp., °F. | Clarified supernatant extraction liquor | |
|---|---|---|---|---|
| | | | Percent total solids | Percent protein |
| Top | 7.1 | 112 | 0.54 | 0.44 |
| 8 | 7.1 | 120 | .51 | .44 |
| 7 | 7.2 | 122 | .48 | .40 |
| 6 | 7.2 | 130 | .36 | .32 |
| 5 | 7.2 | 135 | .22 | .16 |
| 4 | 7.3 | 140 | .14 | .10 |
| 1 | 8.5 | 160 | .03 | .10 |
| 0 | 8.2 | 160 | .07 | .04 |
| Bottom | 8.3 | 160 | .09 | .04 |

COLUMN L

| Top | 7.2 | 39 | 1.58 | 0.68 |
|---|---|---|---|---|
| 5 | 7.1 | | 1.84 | 0.74 |
| 4 | 7.1 | | 2.16 | 0.90 |
| 3 | 7.1 | | 2.06 | 0.84 |
| 2 | 7.1 | | 1.68 | 0.70 |
| 1 | 7.3 | | 0.33 | 0.16 |
| 0 | 7.3 | | 0.32 | 0.18 |
| Bottom | 7.3 | 34 | 0.30 | 0.18 |

EXAMPLE 15

In this run, using the apparatus schematically represented in FIG. 4, 15 lb./hr. of defatted flakes were introduced into column L and about 10 lb./hr. of leached flakes were therefore introduced into column E. Solvent rates of flow for columns L and E were 115 lb./hr. and 110 lb./hr., respectively. The results of operating column L are shown below, with column E removing the remaining alkali-soluble, acid-precipitable protein:

*Table XIX*

COLUMN L

| Sample position | pH | Clarified supernatant leach liquor, percent total solids |
|---|---|---|
| Top | 4.6 | 4.37 |
| 5 | 4.6 | 4.35 |
| 4 | 4.9 | 4.98 |
| 3 | 5.3 | 2.57 |
| 2 | 5.3 | 0.42 |
| 1 | 5.2 | 0.04 |
| Bottom | 5.1 | 0.06 |

EXAMPLE 16

A commercial-sized recovery unit was operated utilizing a 25' high, 4' diameter, 12 plate column. With a flake input of 2000 lbs./hr. and 70% ethyl alcohol as the solvent in an amount yielding a solvent to flake ratio in the column of 5 to 1, there was an average of 5% soluble solids in the effluent. At current prices for syrup (about 50% solids) and evaporation costs, this represented the economic "break-even" point. With a lower concentration of solids in the effluent, the return on the marketed syrup did not justify the expense of operating the column and the subsequent evaporation to raise the concentration from about 5% to about 50%.

While in the foregoing specification, we have set forth detailed descriptions of embodiments of the invention for explanation thereof, those skilled in the art will perceive many variations in the details herein given without departing from the spirit and scope of the invention.

We claim:

1. In a process for the economical recovery of the water-soluble portion from a protein-containing soybean source material for further separate processing to avoid water pollution wherein said source material and an aqueous solvent for said portion are contacted, said aqueous solvent being a member selected from the class consisting of chilled water having a temperature in the range 33°–50° F., an aqueous acid solution, and an aqueous solution of a water-miscible non-acidic organic solvent, said aqueous solvent being effective to inhibit the dissolving of said protein from said source material whereby the globular protein is rendered substantially indispersible, the improvement consisting of passing entry streams of said source material and said aqueous solvent in countercurrent relation while adjusting the ratio of said streams to provide a concentration of said portion in the solvent effluent stream of at least about (2%) 5% and with the material effluent stream being substantially free of said portion, recovering said portion separate from said source material, and evaporatively concentrating said portion to at least a syrup consistency, the weight of said solvent stream passed in said countercurrent relation per unit of time being not greater than about eight times the weight of said source material stream passed in the same time and not less than about two times the weight of said source material stream.

2. The process of claim 1 in which said aqueous solvent is an aqueous acid solution having a pH in the range of about 4 to about 5.

3. The process of claim 2 in which the counter-current passing is carried out at a temperature in the range of about 50° to about 160° F.

4. The process of claim 1 in which said aqueous solvent is an aqueous solution of a water-miscible organic solvent having a concentration of the organic solvent in the range of about 20% to about 80% of the weight of said aqueous solvent.

5. The process of claim 4 in which the concentration of said organic solvent is about 60%–70% of the weight of said aqueous solvent.

References Cited

UNITED STATES PATENTS

| 2,074,988 | 3/1937 | O'Brien et al. | 23—270 |
| 2,331,619 | 10/1943 | Morse | 260—123.5 |
| 2,495,706 | 1/1950 | De Voss | 99—17 |
| 2,559,257 | 7/1951 | Obey | 260—123.5 |
| 2,635,094 | 4/1953 | Belter | 260—123.5 |

OTHER REFERENCES

Circle, S.J.: Proteins and Other Nitrogenous Constituents, chapter VIII, of Soybean Products (1950) (pp. 283, 289, 290, 296–7, 308–10).

WILLIAM H. SHORT, *Primary Examiner.*

H. E. SCHAIN, *Assistant Examiner.*

UNITED STATES PATENT OFFICE
CERTIFICATE OF CORRECTION

Patent No. 3,365,440　　　　　　　　　Dated January 23, 1968

Inventor(s) Sidney J. Circle and Robert W. Whitney

It is certified that error appears in the above-identified patent and that said Letters Patent are hereby corrected as shown below:

Column 20, line 9, delete " (2%)".

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents